UNITED STATES PATENT OFFICE.

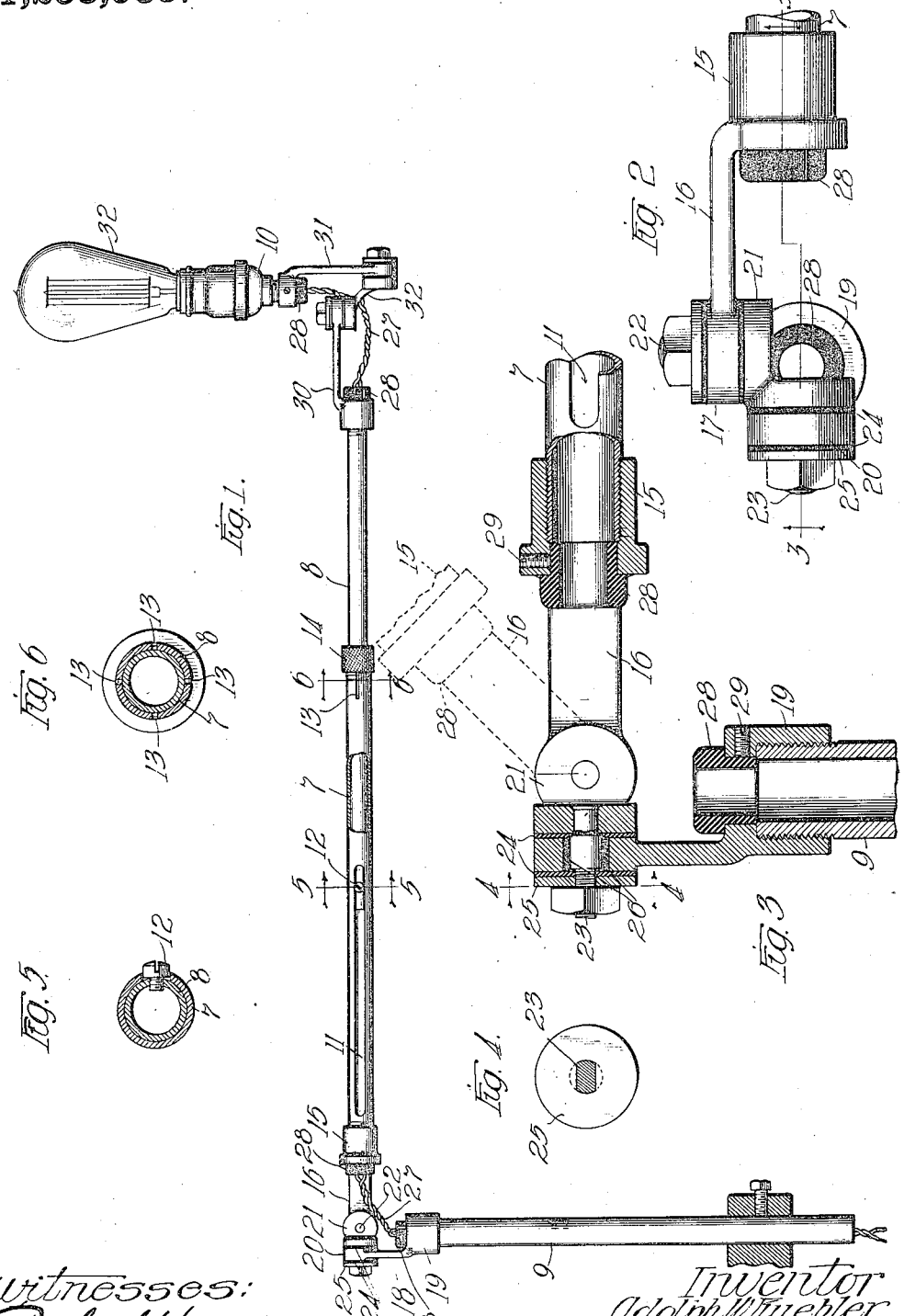

ADOLPH W. KUEBLER, OF CHICAGO, ILLINOIS, ASSIGNOR TO STROMBERG MOTOR DEVICES COMPANY, OF CHICAGO, ILLINOIS, A CORPORATION OF ILLINOIS.

BRACKET FOR ELECTRIC LAMPS OR THE LIKE.

1,253,983.      Specification of Letters Patent.    Patented Jan. 15, 1918.

Application filed July 26, 1915. Serial No. 41,868.

*To all whom it may concern:*

Be it known that I, ADOLPH W. KUEBLER, a citizen of the United States, residing at Chicago, in the county of Cook and State of Illinois, have invented a certain new and useful Improvement in Brackets for Electric Lamps or the like, of which the following is a full, clear, concise, and exact description, reference being had to the accompanying drawings, forming a part of this specification.

My invention relates to brackets for electric lamps and the like.

In many factories and machine shops it is often necessary to carry on accurate machine work as on lathes, grinders, drill-presses, etc., under artificial light. It is of considerable importance that the work be properly illuminated to secure a good product.

It is the object of my invention to provide an improved bracket for holding an electric lamp or the like in any desired position. It is found desirable to insulate the exposed part of the lamp or the bracket in order to avoid shock to the operator or attendant.

It is a further object of my invention to insulate the parts of the brackets to prevent shock to the operator.

I combine the feature of insulation with adjustability by inserting washers of fiber or the like between a bearing or joint surface of the bracket. The fiber washers are excellent insulators and at the same time offer excellent frictional surfaces for holding the joints with the proper rigidity.

I shall now describe more particularly my invention in connection with the accompanying drawings, in which—

Figure 1 is an elevational view of the complete bracket;

Fig. 2 is a plan view of the left hand end of the bracket shown in Fig. 1;

Fig. 3 is a cross-sectional view of the same taken on the line 3, 3, of Fig. 2;

Fig. 4 is a detail view of the bolt and washer taken on the line 4, 4, of Fig. 3;

Fig. 5 is a cross-sectional detail view of the telescoping tubes taken on the line 5, 5, of Fig. 1; and Fig. 6 is a similar view taken on the line 6, 6, of Fig. 1.

The bracket shown in Fig. 1 consists of a pair of telescoping tubes 7 and 8, one of which is fastened by a universal joint to the stationary stud or nipple 9, and the other of which is connected by means of a similar universal joint with the lamp socket 10. The tube 7 is slotted at 11 and a pin 12, shown in this case as a machine screw, is secured to the sleeve 8. This allows of a limited longitudinal relative movement of the two sleeves.

The end of the sleeve 7 is slotted, as shown at 13, and the tapered collar 14 is screw-threaded upon the end thereof, forming therewith a clutch or chuck for gripping the inner sleeve 8 and preventing movement of the parts.

The universal joint shown at the left of Fig. 1 is illustrated in detail in Figs. 2 and 3. The sleeve 7 is threaded into a collar 15, forming the base of a longitudinally extending bracket member 16. The bracket member 16 bears upon its outer end a lug 17 which is provided with faces or machined surfaces to form proper frictional supporting surfaces. A similar longitudinally extending bracket 18, having a collar 19 threaded upon the stationary stud 9, bears a similar lug 20 upon its outer end. The two lugs 17 and 20 are joined together by means of a right angle bracket 21 which has co-operating bearing surfaces for each of the lugs 17 and 20. Bolts 22 and 23 are secured to the angle brackets 21 and pass axially through the lugs 17 and 20 to clamp the parts together. A pair of fiber washers 24 are placed on each side of the lugs 17 and 20 to provide suitable friction surfaces. The bolts 22 and 23 are cut away, as best shown in Fig. 4, and a washer 25 is slipped over the bolt. The washer, due to its engagement with the flat side of the bolt 22 or 23, is relatively non-rotative with the bolt. As a result there is provided a friction surface on each side of the lugs 17 and 20 and there is no tendency for the nuts to be loosened from the bolts.

The bolts 22 and 23 are surrounded by an insulating collar or sleeve 26 where they pass through the lugs 17 and 20. This serves to complete the insulation between the angle bracket 21 and the adjacent brackets 16 and 18. The electric lamp cord 27 passes through the nipple 9 and the sleeves 7 and 8 and as there would be a tendency for the cord to rub against the edges of the metal the open ends of the collars 15 and 19 are rimmed with eyelets of insulation 28, as best shown in Fig. 3. These eyelets are held in place by suitable set-screws 29.

The inner telescoping tube or sleeve 8 is joined to the lamp socket 10 by a universal joint similar in all substantial respects with the one just described, this joint comprising the longitudinal bracket 30, secured to the sleeve 8 and the bracket 31 secured to the lamp socket 10. These two brackets are joined together by means of the angle bracket 32.

It can now be seen that I have provided a lamp bracket which is especially adapted for use in connection with machine tools and the like. The lamp 32 is held rigidly in any position desired, although adjustment can be secured with great ease. In effect the bracket comprises a stationary part which is the part 9, a universal joint, shown at the left of the telescoping tubes, a radius rod of adjustable length comprising the telescoping tubes 7 and 8, and a universal joint at the end of the radius rod. The friction washers 24 maintain a uniform friction at the joint so as to maintain the bracket in any position in which it may be set. In addition, these fiber washers serve to insulate the parts and thus perform a double function.

I do not wish to be confined to the precise details of construction as it will be apparent to a workman skilled in the art that various changes and modifications may be made without departing from the spirit and scope of my invention.

What I claim as new and desire to protect by Letters Patent is the following:

1. In combination, a stationary support having an extension arm and a lamp socket provided with a similar arm, a tubular radius member having a pair of adjustable telescopically related sections, the free ends of which are provided with extensions, right angular bracket members, bolts to pivotally connect said extensions and said right angular brackets, insulating means surrounding the bolts and between the extension arms and brackets, and bushing insulators at the open ends of said supports and tubular radius members, said supports and tubular members being adapted to receive a flexible conductor throughout, and said insulating means serving to frictionally hold the elements in various adjusted positions.

2. In a bracket, a connection comprising apertured members adapted for alinement, a bolt having reduced ends, the intermediate portion of the bolt being disposed in the aperture of one of said members, one free end of said bolt being received in the other member, the opposite end of said bolt being threaded and flattened, a bushing surrounding the intermediate portion of the bolt, a pair of washers on the free ends of the bolt, one of the washers having an aperture conforming to the flattened end of said bolt, and a retaining nut receivable on said threaded end.

In witness whereof, I hereunto subscribe my name this 23rd day of July A. D. 1915.

ADOLPH W. KUEBLER.